United States Patent [19]

Urui et al.

[11] Patent Number: 5,154,870
[45] Date of Patent: Oct. 13, 1992

[54] THERMOPLASTIC RESIN SHEET MANUFACTURING PROCESS AND ITS APPARATUS

[75] Inventors: Yasuhiro Urui, Kusatu; Morimasa Omizu, Okayama, both of Japan

[73] Assignee: Sekisui Kagaku Kogyo Kabushiki Kaisha, Japan

[21] Appl. No.: 727,222

[22] Filed: Jun. 26, 1991

[30] Foreign Application Priority Data

Jul. 3, 1990 [JP] Japan .................. 2-176902

[51] Int. Cl.$^5$ .............................. B29C 47/04
[52] U.S. Cl. ...................... 264/171; 264/75; 264/245; 425/131.1; 425/133.5; 425/462
[58] Field of Search .................. 264/171, 75, 245; 425/131.1, 133.5, 462, 224

[56] References Cited

U.S. PATENT DOCUMENTS

| 3,354,025 | 11/1967 | Aykanian et al. | 264/245 |
| 3,583,032 | 6/1971 | Stafford | 425/133.5 |
| 3,715,420 | 2/1973 | Kiyono et al. | 264/171 |
| 4,316,868 | 2/1982 | Esposito et al. | 264/245 |
| 4,476,075 | 10/1984 | Brinkmann et al. | 264/245 |
| 4,562,023 | 12/1985 | Pabst et al. | 264/75 |
| 4,671,913 | 6/1987 | Gen et al. | 264/171 |
| 4,753,766 | 6/1988 | Pinsolle | 264/245 |

FOREIGN PATENT DOCUMENTS

| 0287861 | 10/1988 | European Pat. Off. | 264/171 |
| 51-109954 | 9/1976 | Japan | 264/171 |
| 55-135642 | 10/1980 | Japan | 425/133.5 |

*Primary Examiner*—Jeffery Thurlow

[57] ABSTRACT

An apparatus and process for making extruded colored thermoplastic resin sheets is shown and described. In this process, a colored thermoplastic sheet material is encapsulated within a clear material. The colored material as it merges with the clear material is subjected to a clear material flow direction vector which causes the colored material to spread or become wider than the color material orifice. The spreading due to clear material flows in a widthwise direction produces a uniform taper to the colored edge, and the point at which the colored material stops and the finished product is barely perceptible. In this apparatus, a clear flow thermoplastic extrusion die has placed within its manifold a colored material distributing inner pipe which has an orifice for inserting color material into the flow of the clear material. The color insertion occurs at a point where the clear material has a flow vector in the widthwise direction and towards the clear portion of the finished product.

28 Claims, 12 Drawing Sheets

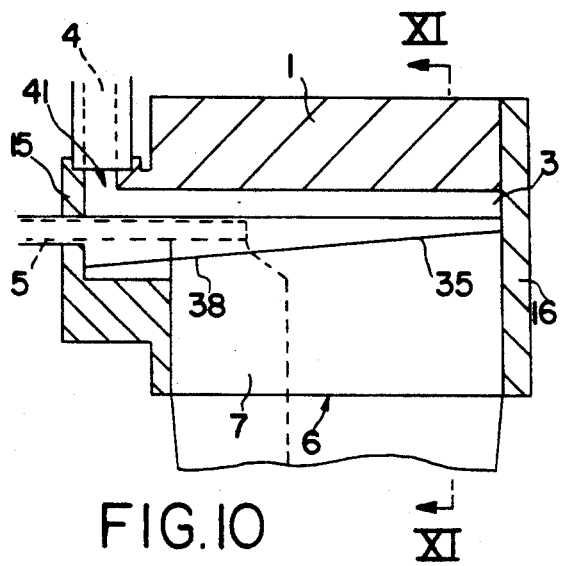
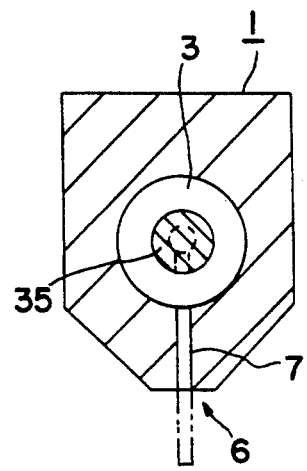
FIG.10  FIG.11
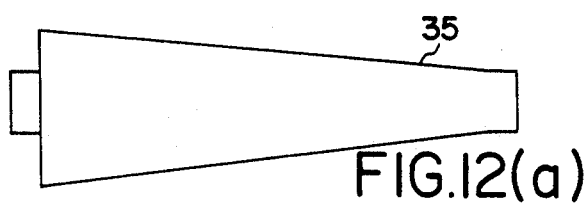
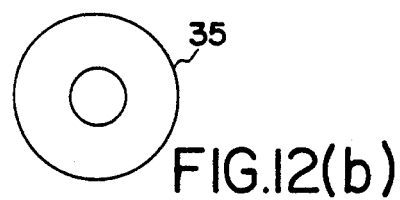
FIG.12(a)  FIG.12(b)
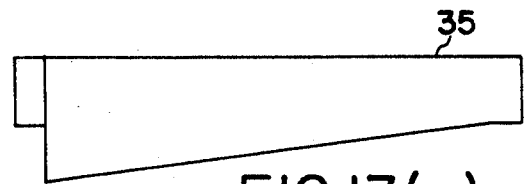
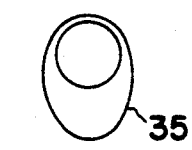
FIG.13(a)  FIG.13(b)

MOLD

WIDTH OF SLIT .................................... 1580 mm

DIAMETER OF MANIFOLD ................... 70 mm

INNER CYLINDER

LENGTH ........................................... 1580 mm

OUTER DIAMETER .............................. 38 mm

INNER DIAMETER ............................... 24 mm

SHORTEST DISTANCE TO MANIFOLD ........ 5 mm

EXTRUSION PARAMETERS

CLEAR RESIN FLOW ........................... 454 kg/h

COLOR RESIN FLOW ............................ 60 kg/h

TEMPERATURE OF CLEAR ................. 196 DEGREES C

TEMPERATURE OF COLOR ................ 196 DEGREES C

RATIO OF CLEAR AND COLOR VELOCITY ....... 1:1

FIG.24

THERMOPLASTIC RESIN SHEET MANUFACTURING PROCESS AND ITS APPARATUS

BACKGROUND OF THE INVENTION

1. Field of the Invention

The present invention relates to a process that uses an extrusion mold to manufacture thermoplastic resin sheets having along the widthwise direction a first (clear) resin section comprising a first thermoplastic resin and a colored section in which a colored band made of the colored thermoplastic resin is encapsulated within the first resin layer formed with the first thermoplastic resin, and an apparatus for manufacturing such sheets.

The windshield glass used in automobiles, and airplanes, and the laminated glass used in windows of buildings, and elsewhere comprise a middle film of plasticized polyvinyl butyral sandwiched between two facing glass plates. Such laminated glass has great strength and fragments do not fly about even if the glass is broken.

2. The Prior Art

A method of manufacturing the middle films used in such laminated process is known. This method feeds to an extrusion mold polyvinyl butyral that has been heated to melting while being mixed in a cylinder, and extrudes it from the extrusion mold to obtain a thin-film for use in the middle of the glass layers.

The middle film so obtained is colorless and transparent, and most of the light passes through this middle film. In order to restrict the transmission of light, attempts have been made to set up a band-shaped colored section along part of the width of the middle film.

For example, in the thermoplastic resin sheets used in automobile windshields, the amount of sunlight shining on the driver through the windshield can be reduced by creating a colored section with a color gradient at the top of the sheet.

The colored section is usually set up in the sheet by printing a band-shaped colored section on the surface of a film made of polyvinyl butyral. However, when the colored section is formed by applying ink, there is the disadvantage that the colored section peels away easily from the film surface. Moreover, after the polyvinyl butyral resin film has been formed, the colored section must be formed, and the manufacturing process is complex, and the equipment is unavoidably large scale.

In Japanese patent publication Hei-1-43606 (U.S. Pat. No. 4,316,868), a process is disclosed for manufacturing sheets with a certain width colored band encapsulated within the thermoplastic resin. In this process, the thermoplastic resin main flow goes into the manifold and is extruded through an extrusion passage and from a slit-shaped die extrusion mold, and colored thermoplastic resin is extruded from a probe orifice which is encapsulated in the main flow.

A 3-layer thermoplastic resin sheet in which colored thermoplastic resin is encapsulated in thermoplastic resin is obtained by using an extrusion mold that has a manifold into which thermoplastic resin is fed, has a probe located in said manifold that feeds colored resin into the manifold and has a slit-shaped die orifice that serves as the extrusion sheet outlet. The clear thermoplastic resin main flow goes into the manifold and is extruded through the slit-shaped die extrusion mold. The colored thermoplastic resin extruded from the wedge-shaped orifice provided in the probe is encapsulated in the main flow of resin.

This process has the following problems.

1. Because the colored resin is extruded parallel to the flow of the main resin, the boundary between the main resin and the colored resin encapsulated in the main resin is clear. In other words, the edges of the colored band are clearly visible. By giving the probe orifice a wedge shape, the boundary between the colored band and the main flow resin can be made a bit unclear, but there are limits to this technique.

2. Because the probe is offset to one side of the manifold, the flow of clear thermoplastic resin sent from the manifold through to the slit-shaped die orifice is nonuniform. The resin extrusion flow amount is nonuniform and the sheet widthwise thickness easily becomes nonuniform.

3. Because the probe is fastened to the mold on only one side, the probe position changes within the manifold and the colored belt shape and sheet thickness are unstable.

SUMMARY OF THE INVENTION

This invention solves the above disadvantages and its object is to provide a manufacturing process and apparatus for thermoplastic resin sheets in which the edge of the colored band encapsulated in the main resin flow is unclear.

Another object of this invention is to provide the manufacturing process and apparatus for thermoplastic resin sheets in which the flow of resin within the manifold is uniform.

Yet another object of this invention is to provide the manufacturing process and apparatus for thermoplastic resin sheets in which the position of the opening through which the colored thermoplastic resin is extruded in the manifold does not change so that the shape of the colored band and the sheet thickness are stable.

This invention is a process using an extrusion mold for manufacturing thermoplastic resin sheets having along the widthwise direction a clear resin section comprising only the clear thermoplastic resin and a colored section in which is encapsulated a colored band comprising colored thermoplastic resin within the first resin layer formed by the first thermoplastic resin.

The extrusion mold has a manifold, a first thermoplastic resin passage and a colored resin passage that feed the first thermoplastic resin and the colored thermoplastic resin, respectively, into said manifold, a slit-shaped die orifice through which said clear thermoplastic resin and said colored resin are extruded out from the manifold, and a land provided between the manifold and the slit-shaped die orifice. The first thermoplastic resin is preferably a transparent thermoplastic resin.

This is a process in which an opening of the colored resin feed passage is provided in a position that has flow of said first thermoplastic resin in the widthwise direction within the manifold and that provides said colored section and first resin section in this order in the direction of the widthwise flow of said first thermoplastic resin. The widthwise flow of the transparent thermoplastic resin is sufficiently great to cause at least a portion of the colored resin to flow in a general grid-wise direction and to cause the colored material to increase in width greater than the width of the orifice for the colored passage, thereby to produce a gradual transition from the colored resin to the clear resin.

Moreover, the apparatus of this invention for manufacturing thermoplastic resin sheets is for manufacturing thermoplastic resin sheets having along the widthwise direction a first resin section comprising only the clear thermoplastic resin and a colored section in which a colored band comprising the colored thermoplastic resin is encapsulated within the first resin layer formed with the first thermoplastic resin.

The apparatus of the present invention is equipped with an extrusion mold and cylindrical inner pipe, and said extrusion mold has a manifold, side plates provided on both sides of the manifold widthwise, a first resin feed passage feeding the first thermoplastic resin into the manifold, a slit-shaped die orifice through which said first thermoplastic resin is extruded out of the manifold, and a space provided between the manifold and the slit-shaped die orifice.

A pipe is located within said manifold and each end of the pipe is supported by one of said side plates.

The pipe has a colored resin feed passage that feeds colored thermoplastic resin into the manifold. A colored resin feed passage opening is provided in a position that has flow of the first thermoplastic resin in the widthwise direction within the manifold. Openings for said colored resin and first resin feed passage are located in this order in the direction of said first thermoplastic resin widthwise flow.

The present invention preferably has an apparatus for manufacturing thermoplastic resin sheets having along the widthwise direction a first resin section comprising only the first clear thermoplastic resin, and a colored section in which a colored belt comprising the colored thermoplastic resin is encapsulated within the first clear resin layer formed with the first thermoplastic resin.

The apparatus is equipped with an extrusion mold and a die plate, and said extrusion mold has a manifold, a first resin feed passage feeding the first thermoplastic resin into said manifold, a slit-shaped die orifice through which said first thermoplastic resin is extruded out of the manifold, and a land provided between the manifold and the slit-shaped die orifice.

The die plate is fastened to the wall at the far end of the manifold, and has a nozzle that feeds colored thermoplastic resin into the manifold.

The opening of the nozzle is provided in a position having flow of the clear thermoplastic resin widthwise within the manifold. An opening for said first resin feed passage and an opening for the colored resin feed passage are provided in this order each extending in the direction of the flow widthwise of said first thermoplastic resin.

An opening for feeding colored thermoplastic resin is provided at a position where the first thermoplastic resin has a flow in a widthwise direction within the manifold, so that the colored thermoplastic resin and a portion of the first thermoplastic resin flow in different directions. The outer portion of the colored thermoplastic resin that contacts the clear thermoplastic resin is strongly affected by the main flow of the first thermoplastic resin. The center portion of the colored resin is, however, little affected by the main flow. Therefore the center portion of the colored resin flows from the opening just about in the direction of extrusion of the colored thermoplastic resin, but an outer portion of the colored thermoplastic resin flows in a direction that is a composite of the direction of extrusion from the orifice of the colored thermoplastic resin and the widthwise direction of flow of the first clear thermoplastic resin.

Since there is clear resin in the composite direction of flow of the two resins, the colored resin is diluted with clear resin. As a result, the width of the colored thermoplastic resin hereafter referred to as the colored band) increases and the thickness of the colored band gradually decreases along the widthwise direction of flow of the first clear resin. The boundary portion (tip) of the colored band becomes extremely thin, and a gradient portion is formed in which the colored section varies from dark to light.

In the apparatus of the present invention, an orifice or opening in the cylindrical inner pipe is provided at a position for feeding the colored thermoplastic resin at a position where the first thermoplastic resin has a flow in the widthwise direction within the manifold. The colored thermoplastic resin being extruded from the orifice is affected by the widthwise flow of the thermoplastic resin, thereby to produce a sheet with a gradual color gradient.

Moreover, since the cylindrical shaped pipe runs the entire width of the manifold, the first thermoplastic resin fed into the manifold flows without disruption across the entire width of the manifold. In addition, each end of the pipe is supported by one of the side boards of the extrusion mold, so the position of the pipe opening does not change within the manifold.

In another preferred apparatus of the present invention, an opening for feeding the colored thermoplastic resin made in a die plate is provided at a position where the first thermoplastic resin has a flow in the widthwise direction within the manifold so that colored thermoplastic resin extruded from a die plate opening is affected by the widthwise flow of the first thermoplastic resin as described above thereby to produce a sheet with a color gradient.

Since the die plate runs the entire width of the manifold, thermoplastic resin fed into the manifold flows without disruption across the entire width of the manifold. In addition, the die plate is fastened to the wall at the far end of the manifold of the extrusion mold, so the position of the die plate opening does not change within the manifold.

BRIEF DESCRIPTION OF THE DRAWINGS

FIG. 10 is the horizontal cross section for another preferred embodiment of the thermoplastic resin sheet manufacturing apparatus of this invention.

FIG. 11 is the cross section along the line XI—XI in FIG. 10.

FIGS. 12 (a) and (b) are the front and side drawings for another probe.

FIGS. 13 (a) and (b) are the front and side drawings for yet another probe.

FIG. 19 is a graph showing the relation between the horizontal axis (the colored band size) and the vertical axis (the color ratio).

FIG. 20 is a graph showing the relation between the horizontal axis (the colored band size) and the vertical axis (the light transmissivity ratio).

FIG. 24 gives actual dimensions and flow rates for the third example.

DETAILED DESCRIPTION OF THE PREFERRED EMBODIMENTS

Figure 1:
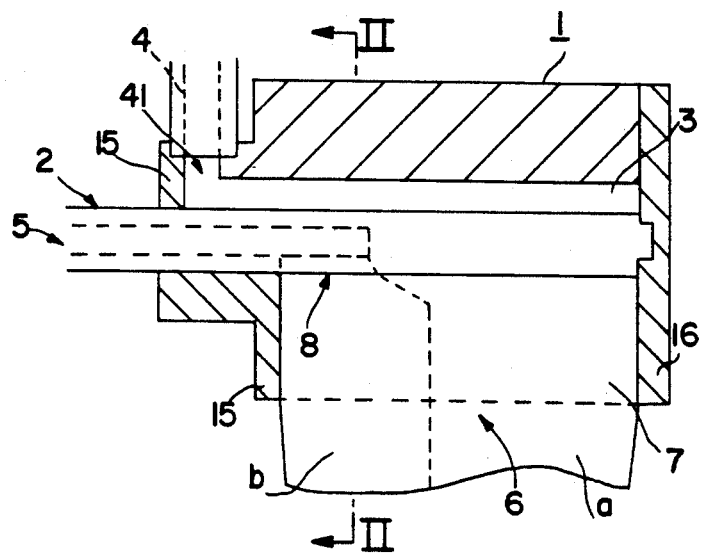
FIG. 1 is a horizontal cross section of the thermoplastic resin sheet manufacturing apparatus for this invention.
Figure 2:
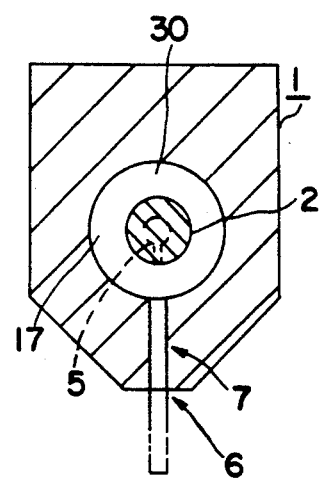
FIG. 2 is a cross section along the line II—II in FIG. 1.

FIG. 1 and FIG. 2 show the apparatus for manufacturing the thermoplastic resin sheet of this invention.

This apparatus has extrusion mold 1 and cylindrical inner pipe 2. Mold 1 comprises the manifold 3 in which the pipe 2 is located, side plates 15 and 16 along the sides of the manifold 3, the clear resin feed passage 4 which feeds the melted clear thermoplastic resin a into manifold 3, the slit-shaped die orifice 6 that serves as the extrusion sheet outlet, and the land 7 that serves as the resin passage through which resin is sent from the manifold 3 to the die orifice 6.

Manifold 3 has a virtually circular cross section and runs almost the entire width of extrusion mold 1. The inlet 41 for the first resin is at one end of this manifold 3 and clear thermoplastic resin a is fed into the manifold 3 from the resin extrusion apparatus (not shown in the figure) through first resin feed passage 4 and resin inlet opening 41. When the resin a is fed into the manifold 3 and fills the manifold 3, it moves in the axial direction of the manifold 3, that is in the widthwise direction of the extrusion mold 1 and is extruded from the land 7 to the slit-shaped die orifice 6. A thermoplastic resin sheet is extruded with virtually the same width as the manifold 3.

The cylindrical inner pipe 2 located in the above manifold 3 is virtually cylindrical. Said cylindrical inner pipe 2 runs the entire width of the manifold 3 and is located either concentric with the manifold 3 or slightly toward the land 7. The two ends of the cylindrical inner pipe 2 are supported by the side plates 15, 16 mentioned above to form the gap 17 between the outer surface of the cylindrical inner pipe 2 and the inner wall of the manifold 3 around the entire circumference.

One side (the previously mentioned resin inlet opening 41 side) of cylindrical inner pipe 2 is empty and colored resin feed passage 5 is located here. Said colored resin feed passage 5 opens into manifold 3 and orifice 8 forms this opening section. Colored resin feed passage 5 is connected to the colored thermoplastic resin extrusion apparatus (not shown in the figure) and the colored thermoplastic resin extruded from said extrusion apparatus flows from colored resin feed passage 5 through the orifice 8 and into the manifold 3.

Figure 3:
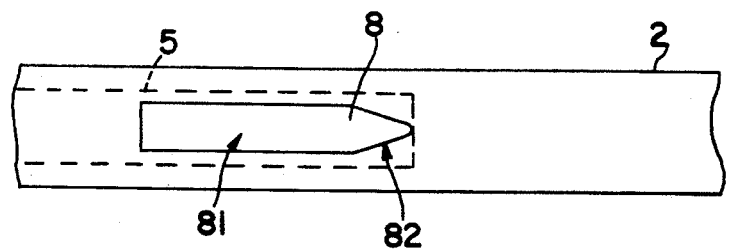
FIG. 3 is the front drawing for the manifold probe.

FIG. 3 shows the shape of this orifice 8. Orifice 8 comprises a rectangular first opening 81 which is long and thin in the horizontal direction and a triangular second opening 82 that is connected to the first opening 81 and whose vertical dimension becomes gradually smaller. Orifice 8 is positioned to face the land 7 previously described. The vertical gap dimension of said orifice 8 is set smaller than the vertical gap dimension of the slit-shaped die orifice 6. The first opening 81 of the orifice 8 is positioned on the first resin feed passage 4 side and the second opening 82 is positioned on the opposite side. It is desirable that the length of orifice 8 be less than half the length of slit-shaped orifice 6. A length 1/10 to ⅓ the length of slit-shaped orifice 6 is particularly desirable.

OPERATION

Clear thermoplastic resin (hereafter referred to as clear resin) (a) is fed by an extruder into the manifold 3 through the passage 4 and the opening 41. Clear resin a fills the manifold 3 gradually from the opening 41 and is extruded toward the outside from the land 7 to the slit-shaped die orifice 6. In the steady state in which the clear resin (a) is fed into the manifold 3, then extruded from the die orifice 6, the flow vectors (resin flow direction and speed) are different at different positions within the manifold 3, see FIG. 4.

Figure 4:
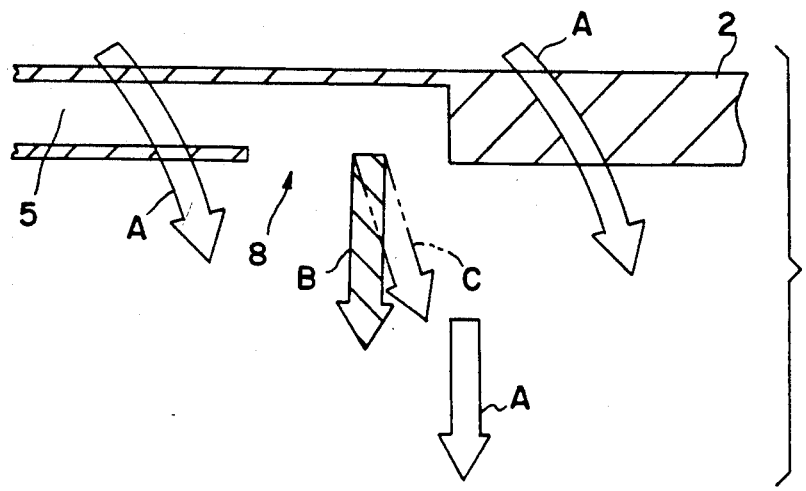
FIG. 4 is a diagram of the clear resin and colored resin flow.

As FIG. 4 shows, the direction for vector A of the flow of clear resin (a) is a composite of the direction widthwise within manifold 3 and the sheet extrusion direction. The reason why the resin widthwise flow of the clear resin is generated within the manifold 3 is that the inflow opening 41 for the clear resin (a) is on one section (in FIG. 1, on the left end) of the wall of the manifold 3. Normally at the deep end of manifold 3, vector A has a relatively large component for the resin flow in the widthwise direction of the manifold 3 and a relatively small component for the resin flow toward sheet extrusion. At the end close to the land 7, vector A has a relatively small component for the resin flow in the widthwise direction of the manifold 3 and a relatively large component for the resin flow toward sheet extrusion. At the die orifice 6, there is almost no resin flow widthwise across the manifold 3 and the resin flow is only in the sheet extrusion direction.

On the other hand, the colored thermoplastic resin (hereafter referred to as colored resin) (b) fed into colored resin feed passage 5 of the probe 2 is sent into the manifold 3 from the probe 2 orifice 8. The orifice 8 is positioned within the manifold 3 where the widthwise flow of clear resin (a) is generated as discussed above. Therefore, the colored resin (b) coming out from the orifice 8 is affected by the flow of clear resin (a) in the following manner.

The colored resin (b) fed out from the orifice flows in the direction in which it is fed (nearly the sheet extrusion direction). The flow direction for colored resin (b) near the orifice 8 is the sheet extrusion direction. The flow of the portion of the colored resin (b) that encounters the clear resin (a) is changed by the flow of clear resin. As explained above, since the clear resin (a) flow vector A has a component in the widthwise direction within the manifold 3, the outer portion of colored resin (b) (the portion near clear resin (a)) is greatly affected by the flow of clear resin (a) and flows along vector C, which is a composite of vector B for the original flow of colored resin (b) and vector A for the flow of clear resin (a). The center portion of colored resin (b), which is only slightly affected by the flow of clear resin a flows virtually in the sheet extrusion direction.

Figure 5A:
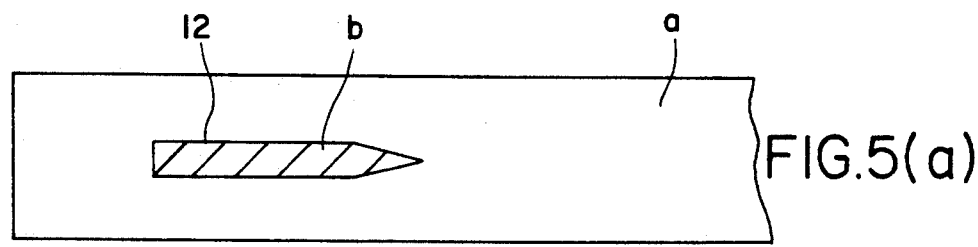
FIGS. 5 (a)-(c) explain the working of the thermoplastic resin sheet.
Figure 5B:
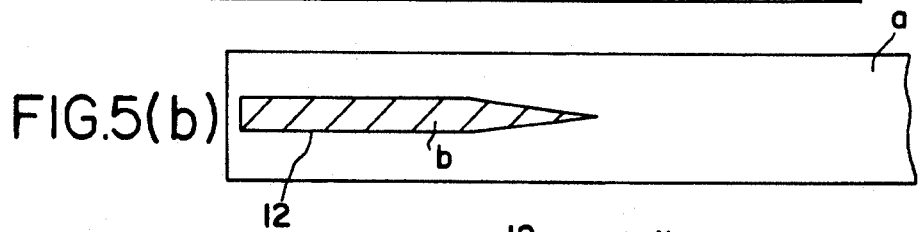
Figure 5C:
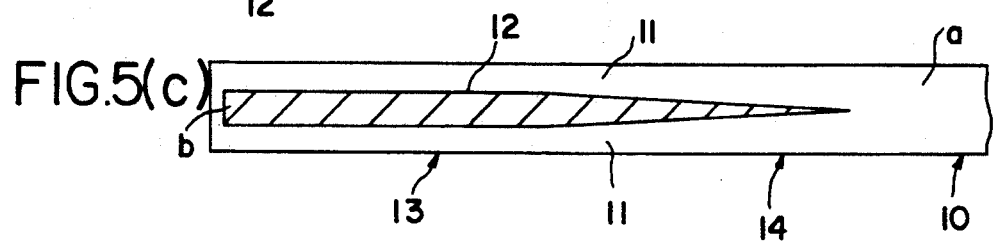

Thus, the vectors for colored resin flow in the middle of the flow thickness and at the edge differ, so as FIGS. 5 (a)-(c) show, the colored band gradually becomes wider and the tip portion of the moving side of the colored band 12 is extremely thin. Also, since there is clear resin (a) at the outer portion of colored resin (b) in the direction it is moving, colored resin (b) is diluted by clear resin (a). In this way and as FIG. 5 (c) shows, the sheet obtained has a first resin section 10 of only clear resin and a colored portion 13 with three layers along its width, two No. 1 resin layers 11 made of clear resin, and the colored band 12 sandwiched within 11. A color gradient portion 14 is formed in which the color gradually changes from dark to light towards the first resin section 10 side.

The profile of this color gradient portion is determined by such conditions as the location within the manifold 3 of the orifice 8 in the probe 2, the shape and size of said orifice 8, the amount and flow speed of clear resin (a) and colored resin (b), and the viscosities of the resins.

If the position of said probe 2 orifice 8 is moved within the manifold toward the slit-shaped die orifice 6, then the widthwise flow component of colored resin (b) due to clear resin (a) is minimal, so the cross section of the gradient portion 14 resembles the shape of the opening of said orifice 8 and the colored band 12 and the color gradient portion 14 are both narrower. On the other hand, if the location of the orifice 8 is moved far from the die orifice 6 within the manifold 3, then the widthwise flow component of colored resin (b) due to clear resin (a) is large and the colored band 12 and the color gradient portion 14 are wider. The greater the width of the probe 2 orifice 8, the wider the colored band 12 and the color gradient portion 14.

If the ratio of the amount of colored resin (b) supplied and the amount of clear resin (a) supplied is changed, the clear resin (a) flow vector A and the colored resin (b) flow vector B change, so the cross-sectional shape and the size of the colored band 12 and color gradient portion 14 formed in the sheet change as well. It is desirable that the ratio between the amount of colored resin (b) fed and clear resin (a) fed be between 0.5/10 and 2/10. It is also desirable that the temperatures of colored resin (b) and of clear resin (a) be the same, but this is not absolutely necessary.

In this invention the thermoplastic resin used as clear resin (a) and as colored resin (b) it may be, for example, polyethylene, polypropylene, polystyrene, polycarbonate, PVC, nylon, polyvinylacetal, acrylic resin, acetal resin, or polyester. Either the same one resin or two resins that can blend together are selected for clear resin (a) and colored resin (b). Plasticizers, fillers, etc. may be added to these thermoplastic resins. For laminated glass, it is desirable that plasticized polyvinyl butyral be used for both clear resin (a) and colored resin (b).

Figure 8A:
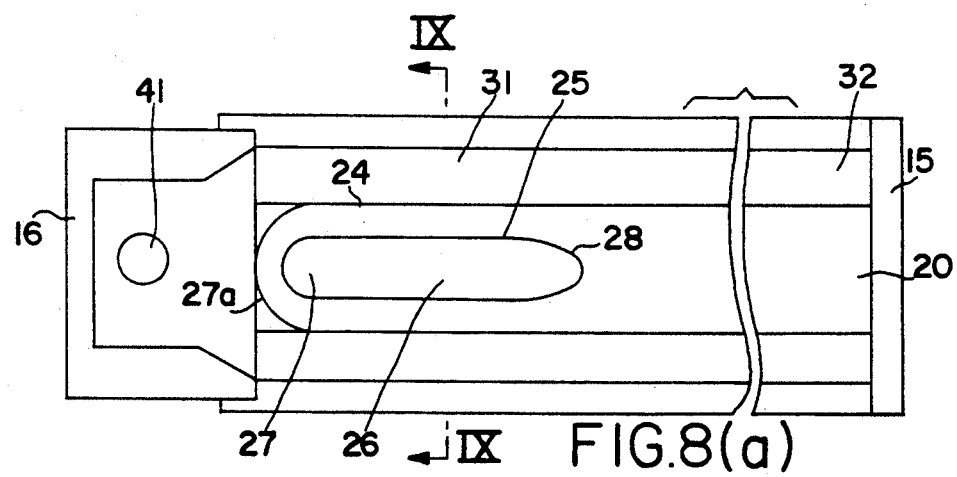
FIGS. 8 (a) and (b) are the front drawing and the plane drawing.
Figure 8B:
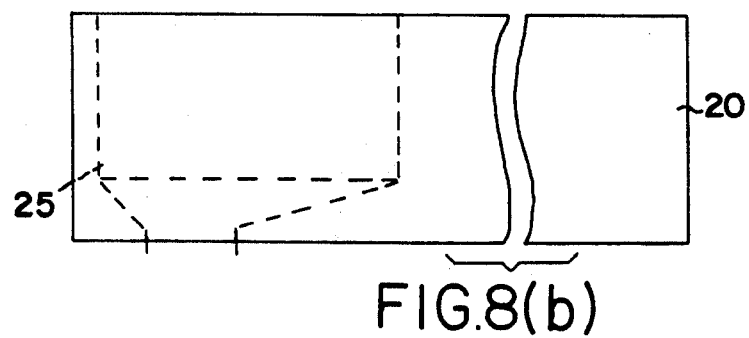

FIGS. 6 through 9 show another preferred embodiment. In this embodiment, a die plate is used instead of the cylindrical inner pipe 2. Die plate 20 is fastened at the far end of the manifold 31 and the nozzle 24 formed at the tip of this die plate projects into the manifold 31. Said nozzle 24 runs virtually the entire width of the manifold 31 and the end of the nozzle 24 at the first resin inlet opening 41 side is curved outward 27a to prevent disruption of the flow of the first resin. An opening 25 is located at the nozzle 24 resin inflow opening 41 side. As FIG. 8 shows, said opening 25 is longer sideways and has the rectangular shaped first opening 26 and the semicircular second opening 27 and third opening 28 on either side of the first opening 26. Compared to the second opening 27, the third opening 28 has a smaller radius of curvature and the tip of the third opening 28 projects out more than the tip of the second opening 27. The nozzle 24 has a resin feed passage 29 for feeding colored resin (b). This resin feed passage 29 passes through the extrusion mold 1.

The above manifold 31 is formed with a triangular cross section. Manifold 31 has three walls, of which one wall 32 is at the far side of the manifold 31. This far side wall 32 is laid out vertically. The other two walls, 33 and 34 connect to the top and bottom of far side wall 32 and slant to the land 7. The front tip of these slanted walls 33 and 34 are separated by a gap with the same dimensions as slit-shaped orifice 6. The above nozzle 24 projects into the manifold 31 from the above far side wall 32 and the nozzle 24 divides the manifold 31 space into top and bottom. It is desirable that the up-down dimension of the above opening 25 be no greater than ½ the up-down dimension of the slit-shaped orifice 6 and a ratio of from 1/10 to ⅓ is even better.

In this apparatus, the only point that differs from the embodiment of FIGS. 1–5 is that colored resin (b) is fed into the manifold 31 from the opening 25 provided in the die plate 20.

Colored resin (b) fed into the manifold 31 from said opening 25 is affected by the flow of clear resin (a) within the manifold and as described above a thermoplastic resin sheet is obtained with the colored belt 12 of colored resin (b) encapsulated in clear resin (a). In this embodiment the shape and dimensions of the colored band 12 are determined by such factors as the position of the above opening 25 in the manifold 31, the shape and size of said opening 25, the amount and speed of clear resin (a) and colored resin (b), and the viscosities of the resins.

FIGS. 10 and 11 show another embodiment where a pipe 35, whose diameter varies along its axis is used instead of the cylindrical inner pipe in Example 1. From the resin inlet passage side (left side of FIG. 10) of said pipe 35 to the right, the diameter of the pipe 35 becomes gradually smaller. Therefore the position of the orifice 38 in this pipe is located farther into the manifold 3 as it moves to the right side of the pipe 35.

When forming extruded sheets using this apparatus, the colored resin (b) sent from the right side portion of the orifice 38 to the manifold 3 has a greater flow component widthwise due to clear resin a than the colored resin from the left side portion of the orifice 38 has, so relatively large colored bands 12 and color gradient portions 14 can be formed.

The right side portion of the orifice 38, in particular the right side tip, is farther into the manifold 3 than the other portions of the orifice, so as a result, the colored resin (b) coming out of the right tip is more affected by the widthwise flow of clear resin (a) and the tip section of the colored band 12, (the color gradient portion 14) is thinner.

The shape of the pipe 35 can be gradually changed as FIGS. 12 and 13 show. The pipe 2 in FIG. 12 has a circular cross section and gradually tapers to a smaller diameter from one end to the other. The probe 2 in FIG. 13 has an elliptical cross section.

With the process of this invention, thermoplastic resin sheets can be obtained with colored bands as described above. In particular, since full use is made of the widthwise flow of the clear thermoplastic resin within the manifold, a colored band is formed having a dark color section with a uniform dark coloration and next to that dark color a color gradient portion that becomes lighter as it moves across the width of the sheet. It is possible to continuously manufacture thermoplastic resin sheets with the extrusion molding method that ar particularly useful for the colored bands of automobile front glass. Also, with the apparatus of this invention, the flow of resin within the manifold is uniform and thermoplastic resin sheets can be obtained in which the colored band shape and the sheet thickness are stable.

FIRST EXAMPLE

Figure 14:
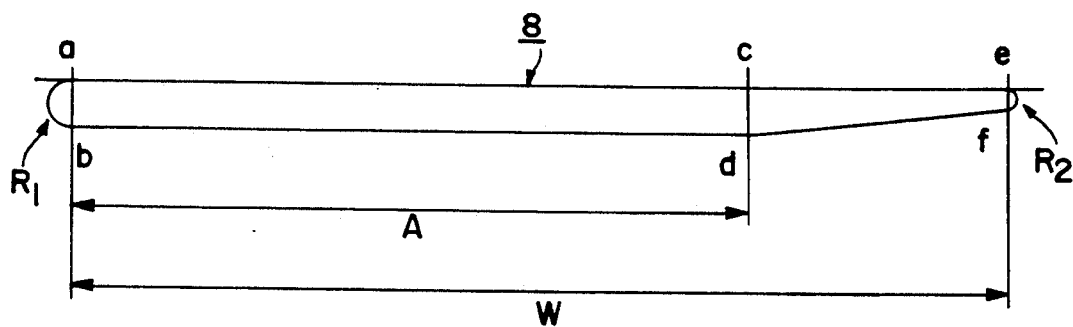
FIG. 14 shows the dimensions of the orifice.

This apparatus was as follows:
In the extrusion mold
Left-right width of slit-shaped die orifice (6): 1000 mm,
Manifold (3)diameter: 60 mm,
Pipe diameter: 30 mm,
Resin feed passage diameter: 18 mm,
Colored resin extrusion amount/clear resin extrusion amount = 0.1, and
Temperature of the resins 150 degrees Centigrade The shape of the probe orifice is as shown in FIG. 14 and the dimensions of all the parts shown in FIG. 14 are as in Table 1.

Figure 15:
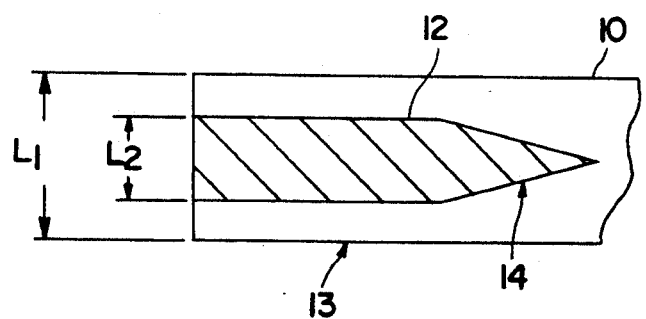
FIG. 15 shows the color ratio for the clear resin and the colored resin.
Figure 16:
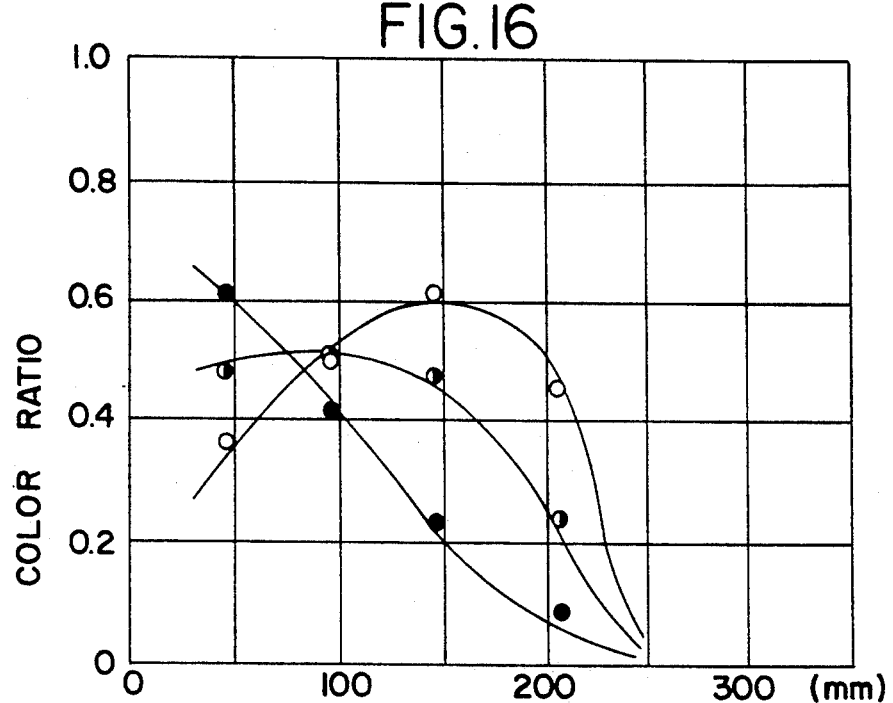
FIG. 16 is a graph showing the relation between the horizontal axis (the colored band size) and the vertical axis (the color ratio).
Figure 17:
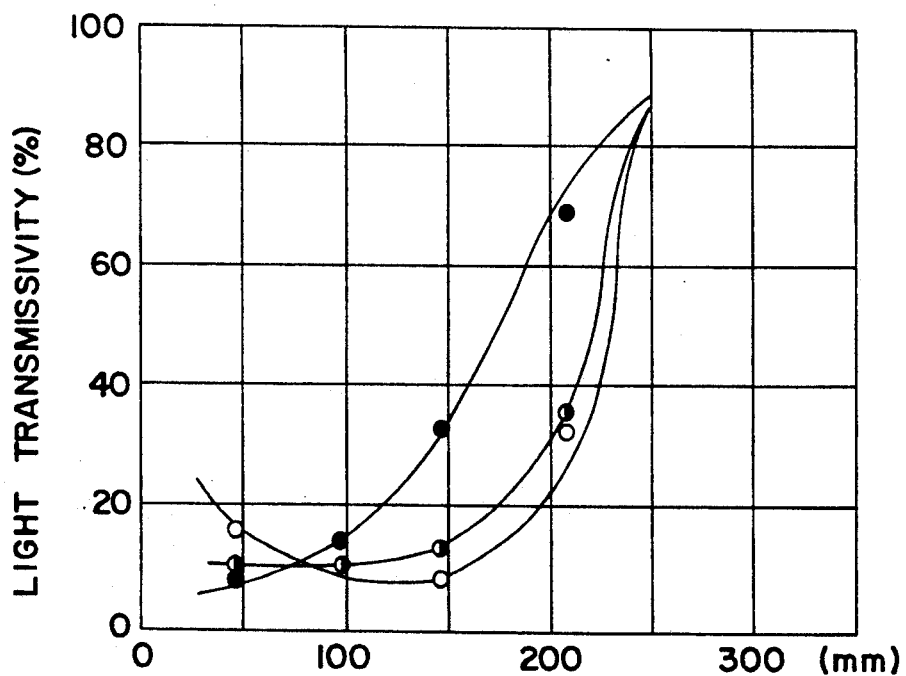
FIG. 17 is a graph showing the relation between the horizontal axis (the colored band size) and the vertical axis (the light transmissivity ratio).
Figure 9:
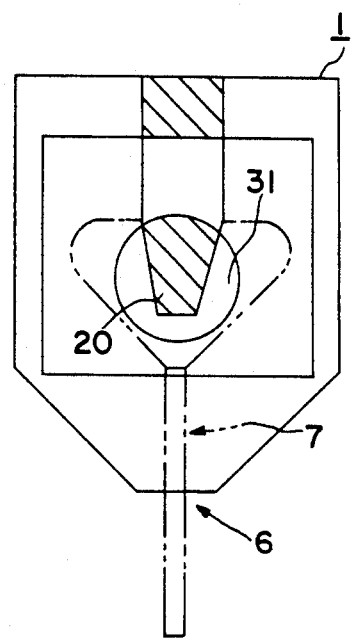
FIG. 9 is the cross section along the line IX—IX in FIG. 8.

The results are shown by Table 2, FIG. 16, and FIG. 17. FIG. 16 is a graph showing the relation between the horizontal axis (the colored band size) and the vertical axis (the color ratio, L2/L1 shown in FIG. 15). FIG. 17 is a graph showing the relation between the horizontal axis (the colored band size) and the vertical axis (the light transmissivity ratio).

In Table 2, the color width is the width of the colored band and the shade width shows the width of the colored band shown in FIG. 17 in which the transmissivity ratio is 70-40%.

SECOND EXAMPLE

Figures 6, 7:
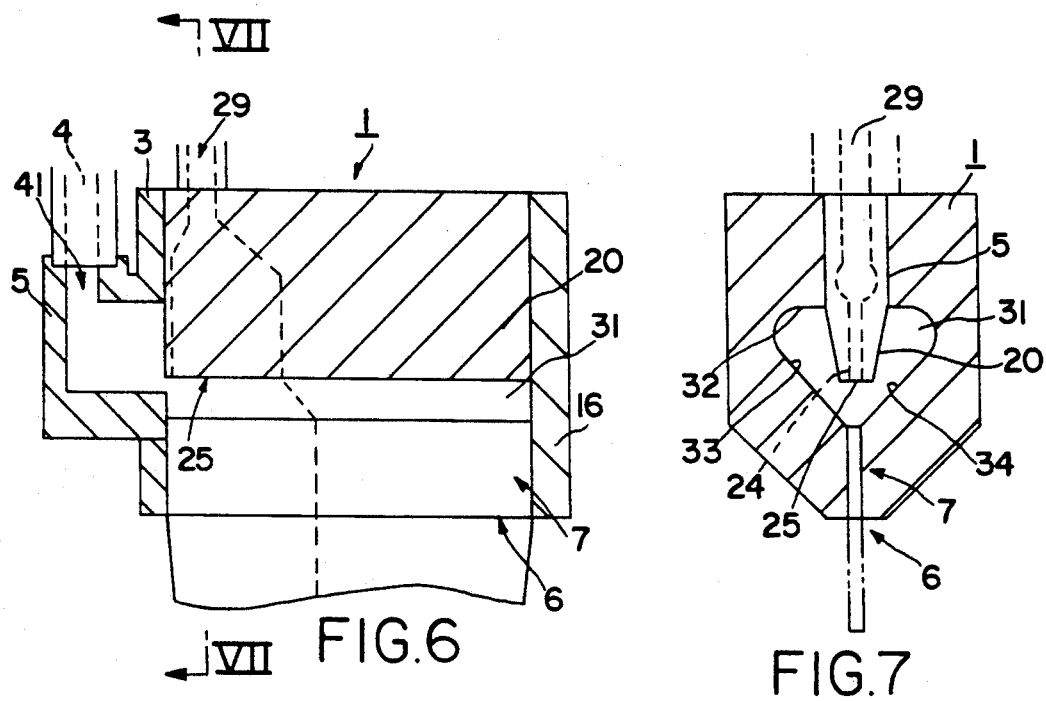
FIG. 6 is a horizontal cross-section for another preferred embodiment for the thermoplastic resin sheet manufacturing apparatus of this invention.
FIG. 7 is the cross section along the line VII—VII in FIG. 6.
Figure 18:
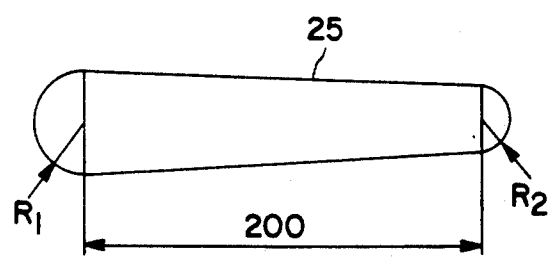
FIG. 18 shows the dimensions of the opening.

Thermoplastic resin sheet was extruded using the apparatus shown in FIG. 6.
In the extrusion mold
Left-right width of slit-shaped die orifice: 1000 mm,
Manifold shape: a right-angled triangle with one side of 100 mm,
Die plate nozzle thickness: 40 mm,
Resin feed passage diameter: 18 mm
Clear resin extrusion amount: 35 kg/hour,
Clear resin temperature: 150 degrees Centigrade,
Colored resin extrusion amount: 7 kg/hour, and
Colored resin temperature: 130 degrees Centigrade As FIG. 18 and Table 3 show, there were two shapes for the opening. The dimensions of the parts shown in FIG. 18 are as shown in Table 3. As a result, the thermoplastic resin sheets shown in Table 3, FIG. 19, and FIG. 20 were obtained.

THIRD EXAMPLE

Figure 21:
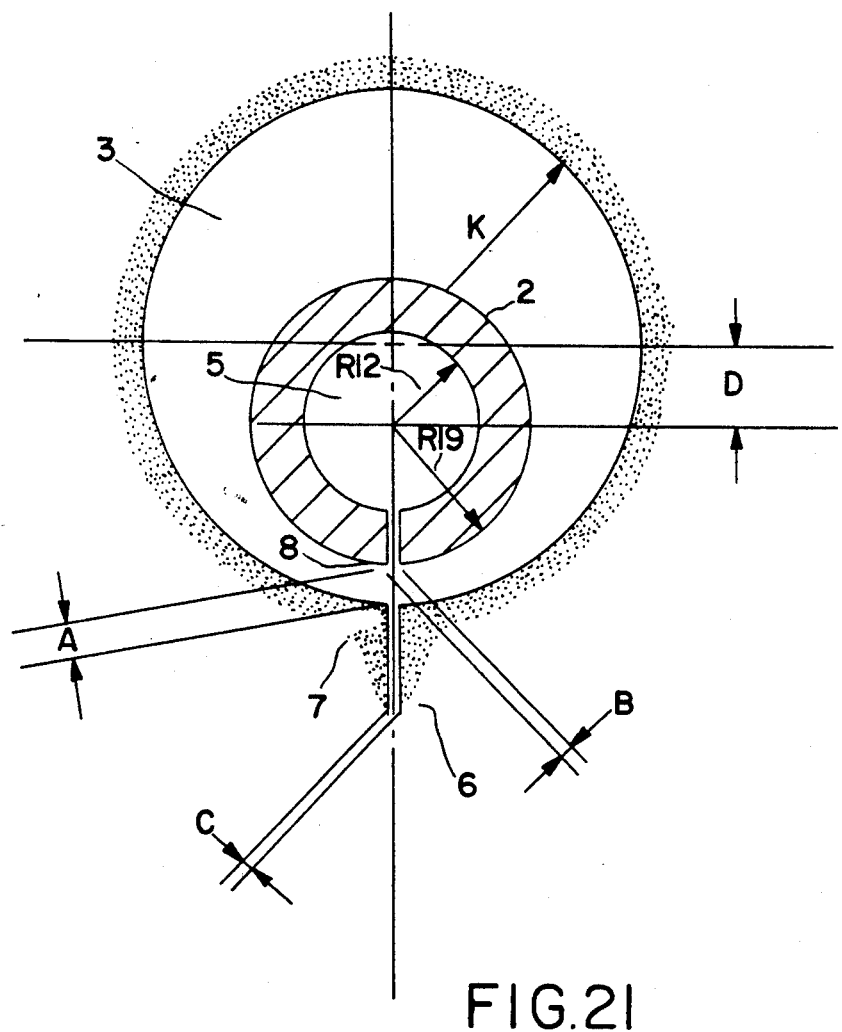
FIG. 21 shows another embodiment of this invention wherein the cylindrical inner cylinder is placed off center within the clear extrusion.

In FIG. 21 there is shown a cross-sectional view of another example of this invention. The cross-sectional view 21 is similar to the cross-sectional view 2, and similar reference numerals have been used to indicate the same components. In this example, the radius of the clear flow first extrusion manifold is 35 mm, the outside of the cylindrical inner pipe 2 is 19 mm, and the inside radius of the inner pipe is 12 mm. The spacing between the inside cylindrical pipe orifice and the entrance to the land of the outside extrusion die is distance A which is 5 mm. In this example, the cylindrical inner pipe is offset from the center of the main extrusion manifold 3 in order to provide the appropriate spacing between the orifice 8 and the entrance to the land 7. This offset is 11 mm. In this example, the width of the extrusion passage or die 6 is 1.2 to 2.5 mm (as shown at distance C). The distance across the cylindrical inner pipe orifice is variable in this example, and therefore the distance B will range from 0.4 to 2.6 mm.

Figure 22:
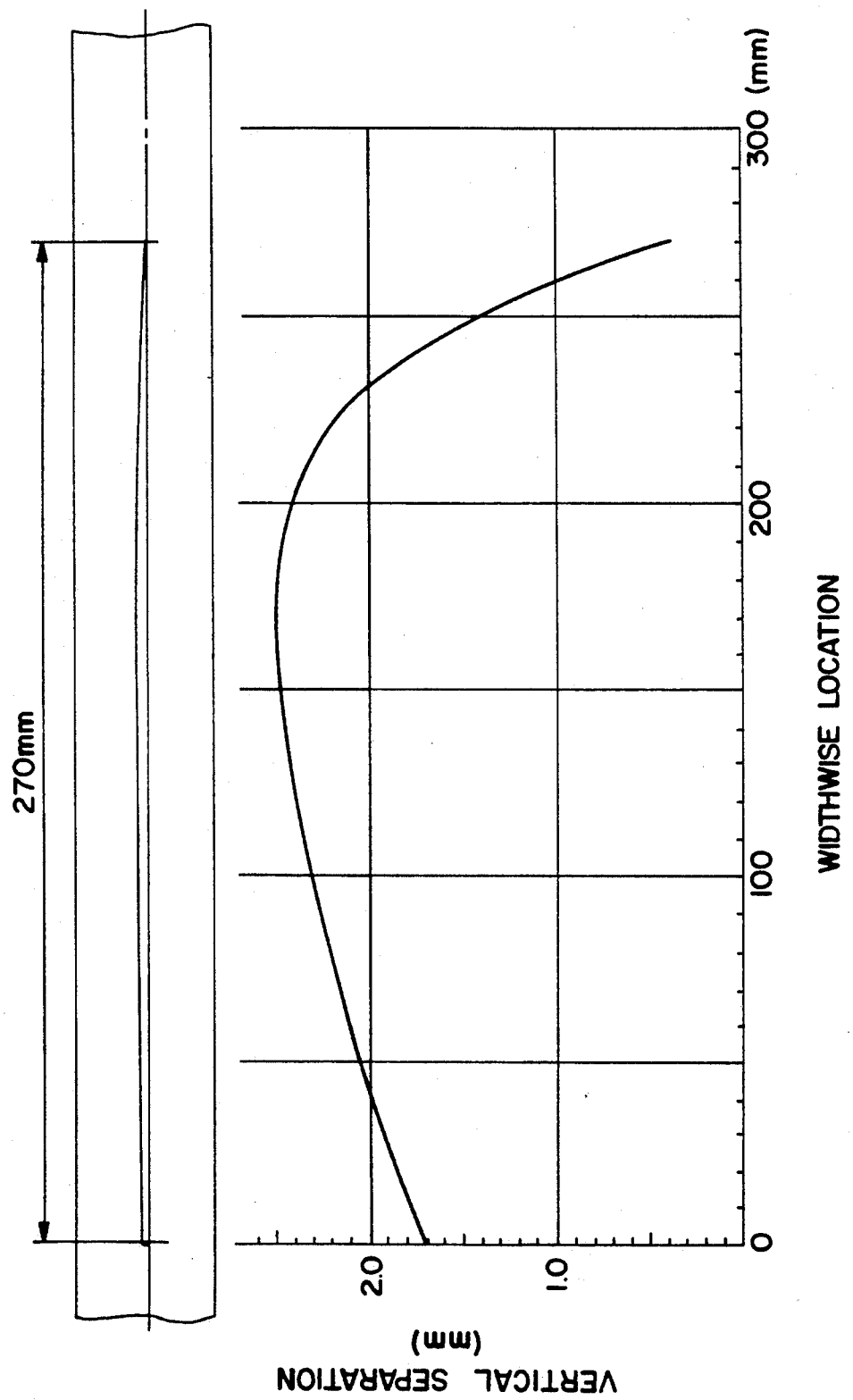
FIG. 22 shows a graph of the width of a colored material extrusion orifice as a function of width. In this figure, the sides are not parallel.
Figure 23:
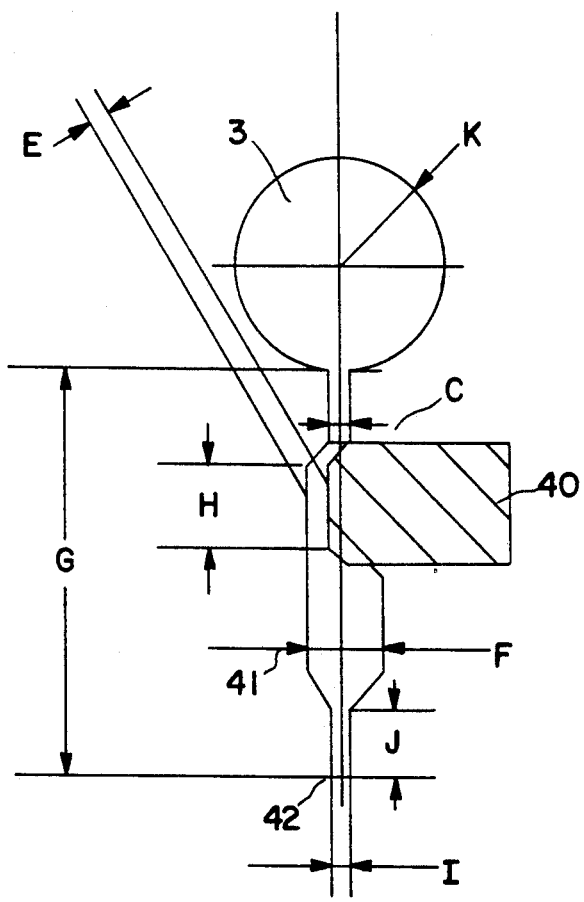
FIG. 23 shows a cross-sectional view of the main mold assembly of the embodiments shown in FIGS. 21 and 22.

The distance B of the orifice H shown in FIG. 21 is also shown in FIG. 22 where applicant has presented a graph of the widthwise direction against the cylindrical pipe orifice vertical separation. Since this graph does not appear as a straight line, it demonstrates that the sides are not parallel as they extend in the widthwise direction of the colored orifice opening. The dimensions given on these drawings are applicable to this third example. In FIG. 23 there is shown a cross section of the main extrusion mold die of example 3. In this drawing, reference numerals 3 and 7 correspond to those shown in FIG. 1. Reference numeral 40 identifies a slidable block which is used to adjust the width of the passageway marked E. Also shown is the pusher manifold 41 and the extrusion exit 42. The dimensions of the mold at FIG. 23 are as follows: C=1.2 to 2.5 mm, E=3 mm, F=14 mm, G=100 mm, H=16 mm, I=0.8 to 0.9 mm, J=20 mm, K=35 mm. In addition to these dimensions, it should be noted that the cylindrical inner pipe 2 is located as shown in FIG. 21 where A=5 mm and the radius K equals 35 mm.

FIG. 24 gives dimensions and material flow rates for the third Example.

Figure 25A:
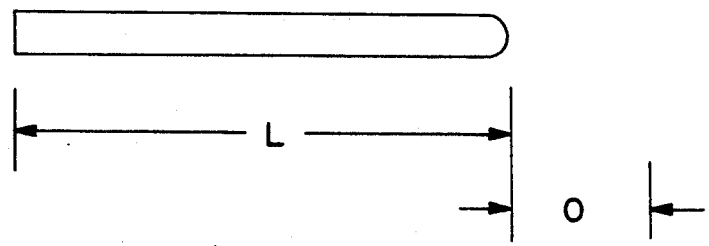
FIG. 25a shows a representation of the cross-section of the orifice from the inner cylindrical pipe.

In FIG. 25a there is shown a cross-section of the colored orifice in the sidewall of the cylindrical inner pipe 2. This is shown as reference numeral 8 in FIG. 1. In this preferred embodiment, the height of the orifice is as shown in FIG. 22. The length L is 270 mm.

Figure 25B:
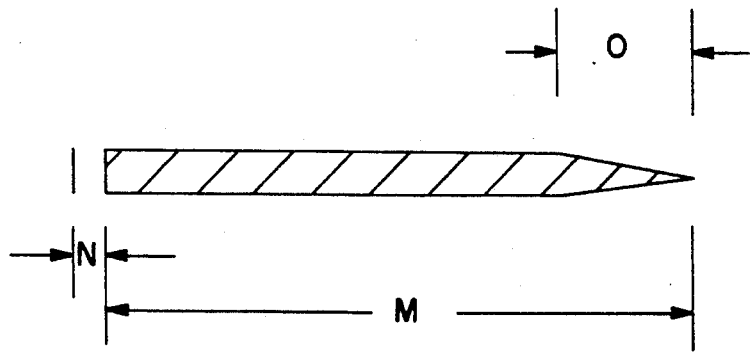
FIG. 25b shows a cross-section of the color melt after the material has passed through the colored orifice and subjected to spreading and position shift as a result of the cross-flows in the widthwise direction present in the clear flow during merger of the two resins.

In FIG. 25b there is shown a representation of the cross-section of the final extruded color band which lies between two layers of clear resin. The effect of the widthwise flow of the clear material upon the shape and position of the colored material is shown in this figure. First it should be noted that the width has been extended to a new width which is 277 mm (dimension M). There is also a slight shift to the right of the entire colored section which in this embodiment is 3 mm as indicated by dimension N. FIG. 25a shows dimension O which shows the shift of the end position of the leading edge of the color material to the right which is the sum of the increased length of the color melt shown in FIG. 25b, (M) and the shift N.

TABLE 1

| | (mm) | | | | | | | | | |
|---|---|---|---|---|---|---|---|---|---|---|
| | W | A | R1 | R2 | a | b | c | d | e | f |
| Example 1 | 200 | 100 | 1.00 | 0.75 | (0, 0) | (0, 2) | (100, 0) | (100, 1.75) | (200, 0) | (200, 1.50) |
| Example 2 | 200 | 100 | 1.00 | 0.50 | (0, 0) | (0, 2) | (100, 0) | (100, 1.50) | (200, 0) | (200, 1.00) |

TABLE 2

| | Color width | Shade width | Ending Line |
|---|---|---|---|
| Example 1 | 256 mm | 16 mm | ○ |
| Example 2 | 255 mm | 42 mm | ○ |

TABLE 3

| | R1 | R2 | Shade width | Ending line |
|---|---|---|---|---|
| Example 3 | 2.0 | 1.5 | 19 mm | △ |
| Example 4 | 2.0 | 1.0 | 40 mm | ○ |

What is claimed is:

1. A process for making thermoplastic resin sheets having a colored section within a first resin section comprising the steps of:
   (a) using an extrusion mold for manufacturing thermoplastic resin sheets, said mold having along the widthwise direction a first resin section manifold for the first thermoplastic resin, and a colored resin section which is within the first resin section manifold;
   (b) introducing said first resin into said first resin section manifold, and colored resin into a colored resin passage;
   (c) extruding said colored resin and said first resin through a slit-shaped die orifice;
   (d) providing a land between the manifold and the slit-shaped die orifice;
   (e) providing an opening in the colored resin passage in a position where there is flow of said first thermoplastic resin in the widthwise direction within the manifold and in the direction away from said colored section.

2. An apparatus for manufacturing thermoplastic resin sheets having along the widthwise direction of the sheet a first thermoplastic resin layer in which a colored thermoplastic resin band is encapsulated;
   (a) said apparatus having an extrusion mold and an inner pipe, and said extrusion mold having a manifold, side plates provided on both sides of the manifold widthwise, a first resin feed passage for feeding first thermoplastic resin into said manifold, a slit-shaped die orifice through which said first thermoplastic resin is extruded, and a land provided between the manifold and the slit-shaped die orifice;
   (b) wherein said inner pipe is located within said manifold, and wherein each end of the inner pipe is supported by one of said side plates;
   (c) said inner pipe having a colored resin feed passage for feeding colored thermoplastic resin within the manifold, wherein said colored resin feed passage opening is located in a position where there is flow of the first thermoplastic resin in the widthwise direction and away from said resin belt within the manifold.

3. The apparatus in accordance with claim 2, wherein an opening for said first resin feed passage and an opening for the colored resin feed passage are elongated and extend in the direction of the widthwise flow of said first thermoplastic resin.

4. The apparatus of claim 2, wherein said inner pipe is cylindrical.

5. The apparatus according to claim 2, wherein the flow away from the resin belt occurs between two layers of said first resin.

6. An apparatus for manufacturing thermoplastic resin sheets having along a widthwise direction a first resin section comprising a first thermoplastic resin and a colored band section made of colored thermoplastic resin which is encapsulated within the first thermoplastic resin layer, comprising in combination:
   an extrusion mold and die plate said extrusion mold having;
   (a) a manifold, a first resin feed passage for feeding the first thermoplastic resin into said manifold, and a slit-shaped die orifice through which said first thermoplastic resin is extruded out of the manifold;
   (b) a pipe inside of said manifold fastened to walls at the end of the manifold, and said pipe having a nozzle that feeds colored thermoplastic resin into the manifold; and
   (c) wherein an opening of said nozzle is provided in a position having flow of the first thermoplastic resin widthwise within the manifold and in a direction away from said colored belt section.

7. The apparatus of claim 6, wherein there is an opening for said first resin feed passage and an opening for the colored resin feed passage in this order in the direction of the flow widthwise of said first thermoplastic resin.

8. The apparatus of claim 6, wherein said manifold and said pipe have inlets which are at the same end of said manifold.

9. An apparatus for extruding a thermoplastic sheet having a colored portion and a first portion comprising in combination:
   (a) a first extrusion die having a slit for extruding said first portion;
   (b) said first extrusion die having a passage through which said first portion flows in a widthwise direction, and a slit-shaped die orifice extending in the widthwise direction;
   (c) a color extruding die having an orifice extending in said widthwise direction and located within said first extrusion die for introducing said colored material into said first material to form two layers of said first material; and
   (d) wherein said color extruding orifice has all of its sides which extend in a widthwise direction not parallel to each other.

10. The apparatus according to claim 6, wherein said inner pipe is cylindrical.

11. The apparatus according to claim 3, wherein said inner pipe is cylindrical.

12. The apparatus according to claim 7, wherein said pipe is cylindrical.

13. The apparatus according to claim 2, wherein said pipe is conical in shape and the distance from said manifold to said pipe varies as a function of the widthwise location.

14. The apparatus in accordance with claim 2, wherein said inner pipe has at least one portion of said feed passage opening closer to said manifold than another.

15. The apparatus according to claim 9, wherein the widthwise portion of the flow from the first extrusion die orifice is in a direction which is away from said colored portion, whereby said colored portion is carried by said first portion widthwise flow in a direction which makes the colored portion wider in said widthwise direction than said color extruding orifice.

16. An apparatus for the extrusion of a thermoplastic polymer having a color band, comprising in combination:
   (a) a first extrusion mold having a manifold and a slit dye orifice;
   (b) an inner passage located in the extrusion mold manifold and having an orifice;
   (c) means for supplying a first resin to said manifold and means for supplying a second color resin to said inner passage;
   (d) spacing said inner passage a sufficient distance from said manifold slit die orifice to permit flow of the first material in a widthwise direction wherein said widthwise direction flow causes spreading of said colored resin as it passes between said orifice and said slit-shaped dye orifice; and wherein said spreading increases the width of said colored resin as compared to the inner passage orifice width.

17. The apparatus in accordance with claim 16, wherein said inner passage is a pipe.

18. The apparatus in accordance with claim 16, wherein said inner passage is a cylindrical pipe.

19. The apparatus in accordance with claim 16, wherein said inner passage is a conical pipe.

20. The apparatus in accordance with claim 16, wherein said extrusion manifold has a circular cross-section.

21. The apparatus in accordance with claim 16, wherein said extrusion manifold has a generally triangular cross-sectioned shape.

22. The apparatus in accordance with claim 21, wherein said inner passage is formed in a plate extending from the base of said triangle, and where the slit-shaped die orifice is located at a top of said triangle.

23. The apparatus in accordance with claim 16, wherein said passage is in a die plate.

24. A process for the extrusion of a thermoplastic polymer sheet with a gradient color band incorporated therein which comprises:
   (a) providing a first extrusion mold having a manifold and a slit die orifice;
   (b) providing an inner passage located in the extrusion mold manifold and having an orifice;
   (c) providing means for supplying a first resin to said manifold, and means for supplying a second color resin to said inner passage;
   (d) spacing said inner passage a sufficient distance from said manifold slit die orifice to permit flow of the first resin in a widthwise direction wherein said widthwise direction flow causes spreading of said colored material as it passes between said orifice and said slit-shaped die orifice;
   (e) feeding a main flow of molten thermoplastic resin to the manifold and a colored flow of the same resin to the passage;
   (f) extruding both flows simultaneously to form a layer of color resin that is greater in width than the orifice in said passage, which tapers in thickness as a result of widthwise flow of the first resin, and which is completely encapsulated within a main flow molten resin; and
   (g) extruding the combined flows through the slit-shaped die orifice to produce a shape with an encapsulated gradient color band.

25. The process according to claim 24, in which the inner passage is inserted into the manifold at the same end as the first resin is inserted into said manifold.

26. The process according to claim 24, wherein said passage orifice has sides which are not parallel in the direction of the slit-shaped dye orifice.

27. A process for the extrusion of a thermoplastic polymer sheet with a gradient color band incorporated therein which comprises:
   (a) providing a first extrusion mold having a manifold and a slit die orifice;
   (b) providing an inner passage located in the extrusion mold manifold and having an orifice;
   (c) providing means for supplying a first resin to said manifold, and means for supplying a second color resin to said inner passage; and
   (d) spacing said inner passage a sufficient distance from said manifold slit die orifice to permit flow of the first resin in a widthwise direction.

28. An apparatus for the extrusion of a thermoplastic polymer having a color band, comprising in combination:
   (a) a first extrusion mold having a manifold and a slit die orifice:
   (b) an inner passage located in the extrusion mold manifold and having an orifice;
   (c) means for supplying a first resin to said manifold and means for supplying a second color resin to said inner passage;
   (d) spacing said inner passage a sufficient distance from said manifold slit die orifice to permit flow of the first material in a widthwise direction wherein said widthwise direction flow causes spreading of said colored resin as it passes between said orifice and said slit-shaped die orifice; and
   wherein the clear flow is sufficiently great in a widthwise direction to cause at least a portion of the colored resin to flow in a general widthwise direction and to cause the colored material to increase in width greater than the width of the orifice for the colored passage, thereby to produce a gradual transition from colored to clear.

* * * * *